United States Patent
Lin et al.

(10) Patent No.: US 10,801,894 B2
(45) Date of Patent: Oct. 13, 2020

(54) REFLECTING SHELL AND TEMPERATURE DETECTING DEVICE

(71) Applicant: RADIANT INNOVATION INC., Hsinchu (TW)

(72) Inventors: Tseng-Lung Lin, Hsinchu (TW); Chin-Hui Ku, Hsinchu (TW)

(73) Assignee: RADIANT INNOVATION INC., Hsinchu (TW)

( * ) Notice: Subject to any disclaimer, the term of this patent is extended or adjusted under 35 U.S.C. 154(b) by 247 days.

(21) Appl. No.: 16/038,288

(22) Filed: Jul. 18, 2018

(65) Prior Publication Data

US 2020/0025617 A1  Jan. 23, 2020

(51) Int. Cl.
  *G01J 5/00* (2006.01)
  *G01J 5/04* (2006.01)
  *G01J 5/02* (2006.01)
  *G01K 13/00* (2006.01)

(52) U.S. Cl.
  CPC ............. *G01J 5/049* (2013.01); *G01J 5/0025* (2013.01); *G01J 5/021* (2013.01); *G01J 5/025* (2013.01); *G01K 13/004* (2013.01)

(58) Field of Classification Search
  CPC .......... G01J 5/00; G01J 5/0025; G01J 5/0265; G01J 5/0014; G01J 5/049; G01K 13/00; G01K 13/002; G01K 13/004; G01K 1/00; G01K 1/08
  USPC .......... 702/135; 374/126, 158, 209; 600/184
  See application file for complete search history.

(56) References Cited

U.S. PATENT DOCUMENTS

| | | | | |
|---|---|---|---|---|
| 5,991,652 A * | 11/1999 | Barthelemy | ............. | G01J 5/04 374/208 |
| 6,371,925 B1 * | 4/2002 | Imai | ............. | G01J 5/02 374/E13.003 |
| 6,751,497 B2 * | 6/2004 | Fraden | ............. | G01J 5/04 374/E13.003 |
| 7,001,066 B1 * | 2/2006 | Bellifemine | ............. | G01J 5/02 374/121 |
| 7,815,367 B2 * | 10/2010 | Lane | ............. | G01J 5/0022 374/121 |
| 8,591,103 B2 * | 11/2013 | Lane | ............. | G01J 5/0022 374/121 |
| 9,055,924 B2 * | 6/2015 | Roth | ............. | A61B 5/6887 |

(Continued)

FOREIGN PATENT DOCUMENTS

JP  2000237147 A * 9/2000

*Primary Examiner* — Gail Kaplan Verbitsky
(74) *Attorney, Agent, or Firm* — Li & Cai Intellectual Property (USA) Office

(57) ABSTRACT

A reflecting shell includes a hollow joint unit, a hollow guide unit and a hollow receiving unit. The hollow joint unit has a stationary part at one end, and the stationary part is detachably connected to a detecting part of a measuring device. One end of the hollow guide unit is connected to the other end of the hollow joint unit, and an internal wall of the hollow guide unit has a first reflective surface and a second reflective surface, in which the first reflective surface and the second reflective surface correspond to each other. One end of the hollow receiving unit is connected to the other end of the hollow guide unit. Heat radiation from a heat source enters the hollow guide unit, and the heat radiation is transmitted to the detecting part by the reflection of the first reflective surface and the second reflective surface.

8 Claims, 11 Drawing Sheets

(56) References Cited

U.S. PATENT DOCUMENTS 9,357,930 B2 *  6/2016  Quinn .................... A61B 5/01
2008/0089387 A1 *  4/2008  Price .................... G01J 5/0887
374/158

* cited by examiner

REFLECTING SHELL AND TEMPERATURE DETECTING DEVICE

FIELD OF THE DISCLOSURE

The present disclosure relates to a reflecting shell and a temperature detecting device, and more particularly to a reflecting shell which allows a measuring device to measure a forehead temperature, and a temperature detecting device which can measure both ear temperature and forehead temperature.

BACKGROUND OF THE DISCLOSURE

In recent years, due to changes in temperature and environment, a variety of viruses and germs have bred and thrived, e.g., enterovirus, influenza. Therefore, people's awareness of self-health management has also increased. When feeling discomfort, people would take their own temperature to determine whether or not they are coming down with a fever, and if yes, they would seek medical advice as soon as possible which can reduce the spread of infectious diseases.

The conventional devices for taking body temperature are divided into traditional thermometers and modern thermometers, e.g., ear thermometers and forehead thermometers. Since the traditional thermometers are usually used to measure the temperature of mouth, underarm, and anus, they are inconvenient to use and cannot measure the temperature of more than one person at a time. Therefore, portable ear thermometers and forehead thermometers are more commonly used in public. The method of measuring ear temperature by the ear thermometer is inserting the head of the ear thermometer into a subject's ear; however, this method may harbor hygienic concerns. The forehead thermometers are non-contact measuring devices and are more hygienic, but due to their sensitivity to surroundings and measuring distance, the measured results are often inaccurate.

Moreover, the ear thermometer and the forehead thermometer cannot both be incorporated on one device, so that it is hard to improve the convenience and scope of application thereof, and further results in the need for a user to prepare both at the same time, which is inconvenient and costly.

SUMMARY OF THE DISCLOSURE

In response to the above-referenced technical inadequacies, the present disclosure provides a reflecting shell and a temperature detecting device. In certain aspects, the reflecting shell of the present disclosure includes a hollow joint unit, a hollow guide unit, and a hollow receiving unit. One end of the hollow joint unit has a stationary part, and the stationary part is detachably connected with a detecting part of a measuring device. One end of the hollow guide unit is connected with the other end of the hollow joint unit. An inner wall of the hollow guide unit has a first reflective surface and a second reflective surface which correspond to each other. One end of the hollow receiving unit is connected with the other end of the hollow guide unit. Heat radiation from at least one heat source enters the hollow guide unit through the end of the hollow receiving unit which is connected with the hollow guide unit, and the heat radiation is transmitted to the detecting part by the reflection of the first reflective surface and the second reflective surface.

In certain aspects, the present disclosure provides a temperature detecting device having a detecting device and a reflecting shell. The detecting device has a detecting part. The reflecting shell includes a hollow joint unit, a hollow guide unit, and a hollow receiving unit. One end of the hollow joint unit has a stationary part. The stationary part is detachably connected with the detecting part of the detecting device. One end of the hollow guide unit is connected with the other end of the hollow joint unit. An inner wall of the hollow guide unit has a first reflective surface and a second reflective surface which correspond to each other. One end of the hollow receiving unit is connected with the other end of the hollow guide unit. Heat radiation from the at least one heat source enters the hollow guide unit through the end of the hollow receiving unit which is connected with the hollow guide unit, and the heat radiation is transmitted to the detecting part by the reflecting of the first reflective surface and the second reflective surface.

One of the beneficial advantages of the present disclosure is that the reflecting shell and the temperature detecting device have technical features of "one end of the hollow joint unit has a stationary part, and the stationary part is detachably connected with the detecting part of the detecting device", "one end of the hollow guide unit is connected with the other end of the hollow joint unit, and an inner wall of the hollow guide unit has a first reflective surface and a second reflective surface which correspond to each other", "one end of the hollow receiving unit is connected with the other end of the hollow guide unit", and "heat radiation from at least one heat source enters the hollow guide unit through the end of the hollow receiving unit which is connected with the hollow guide unit, and the heat radiation transmits to the detecting part by the reflection of the first reflective surface and the second reflective surface", so that the detecting device has the function of taking forehead temperature. Compared with the conventional non-contact thermometer, the detecting device of the present disclosure has the focusing function and a longer detecting distance. In addition, the temperature detecting device of the present disclosure can both detect ear temperature and forehead temperature.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, in which.

DETAILED DESCRIPTION OF THE EXEMPLARY EMBODIMENTS

Figure 1:
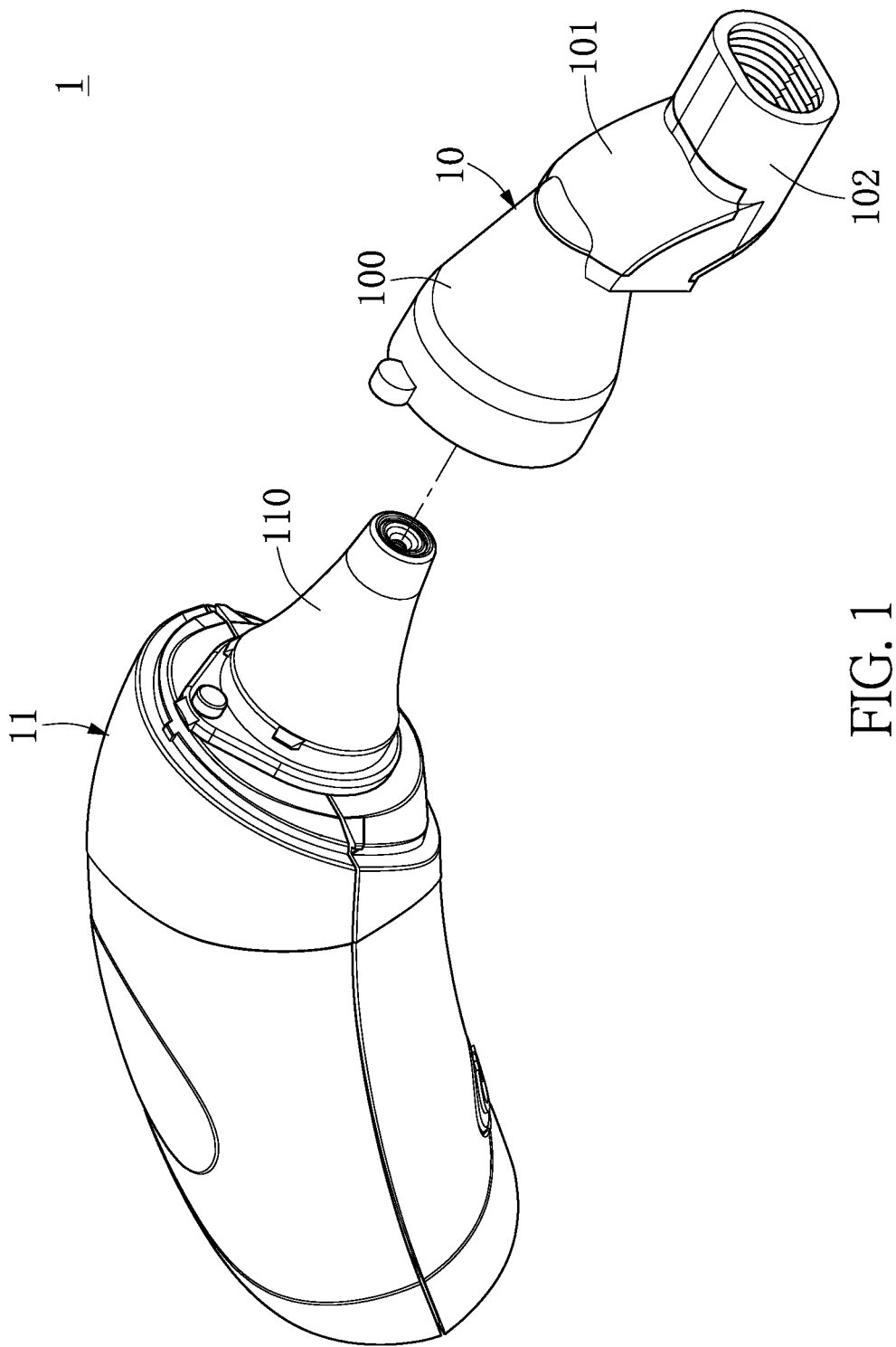
FIG. 1 is a stereoscopic view of a reflecting shell according to a first embodiment of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this disclosure.

Unless otherwise defined, all technical and scientific terms used herein have the same meaning as commonly understood by one of ordinary skill in the art to which this disclosure pertains. In the case of conflict, the present document, including definitions will control.

While numbering terms such as "first", "second" or "third" may be used in this disclosure to describe various components, signal or the like, the terms are for distinguishing one component from another component, or one signal from another signal only, and are not intended to, nor should they be construed to impose any other substantive descriptive limitations on the components, signals or the like.

First Embodiment

Figure 2:
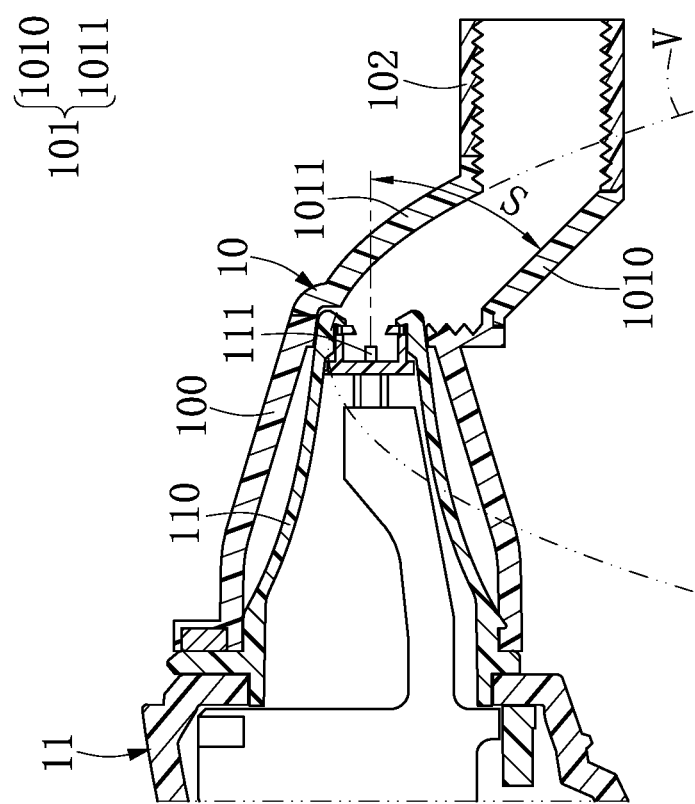
FIG. 2 is a cross-sectional view of the reflecting shell according to the first embodiment of the present disclosure.
Figure 3:
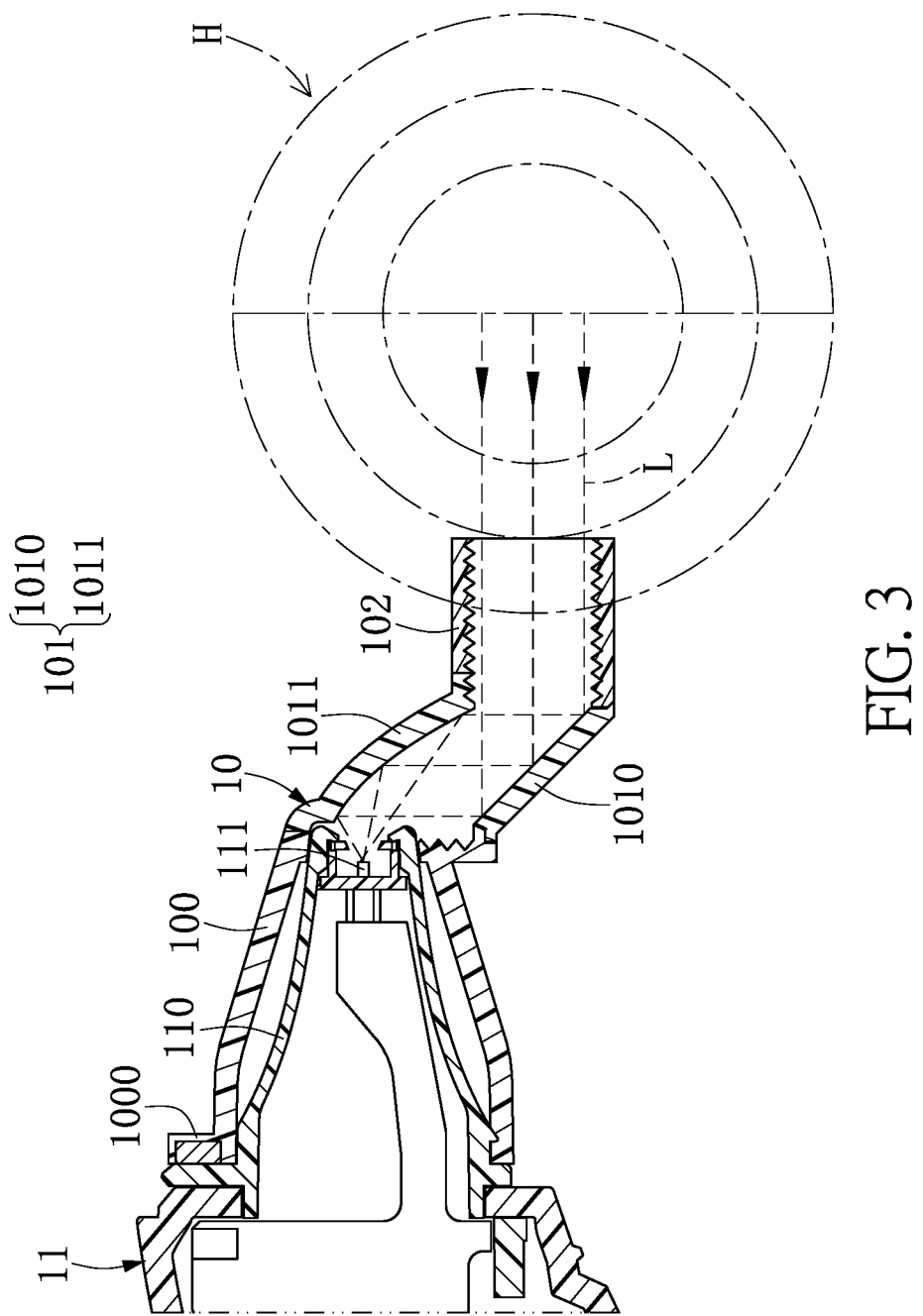
FIG. 3 is a first schematic view according to the first embodiment of the present disclosure, illustrating the reflection paths that the reflecting shell reflects heat radiation received from heat sources at different distances.
Figure 4:
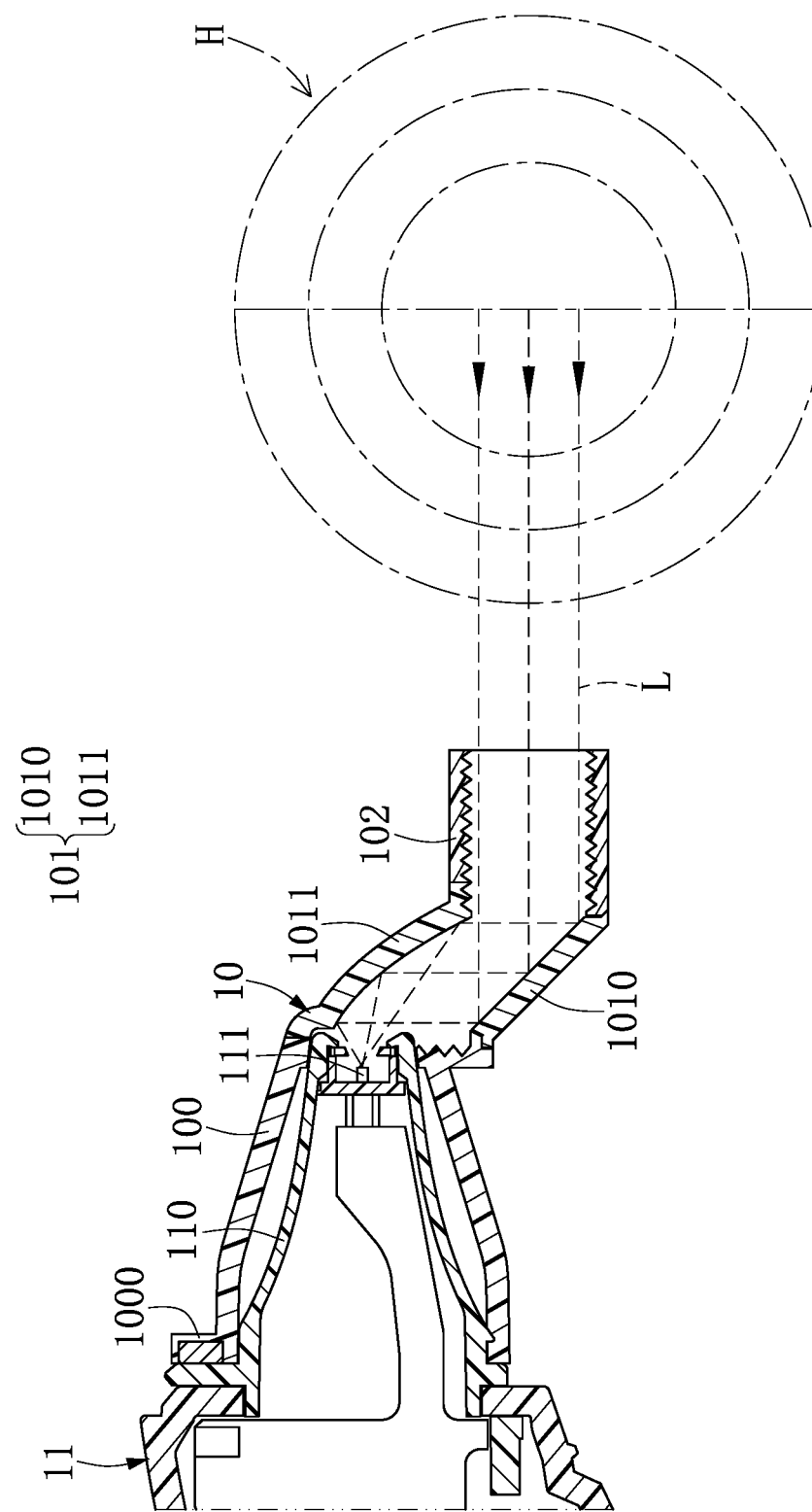
FIG. 4 is a second schematic view according to the first embodiment of the present disclosure, illustrating the reflection paths that the reflecting shell reflects heat radiation received from heat sources at different distances.
Figure 5:
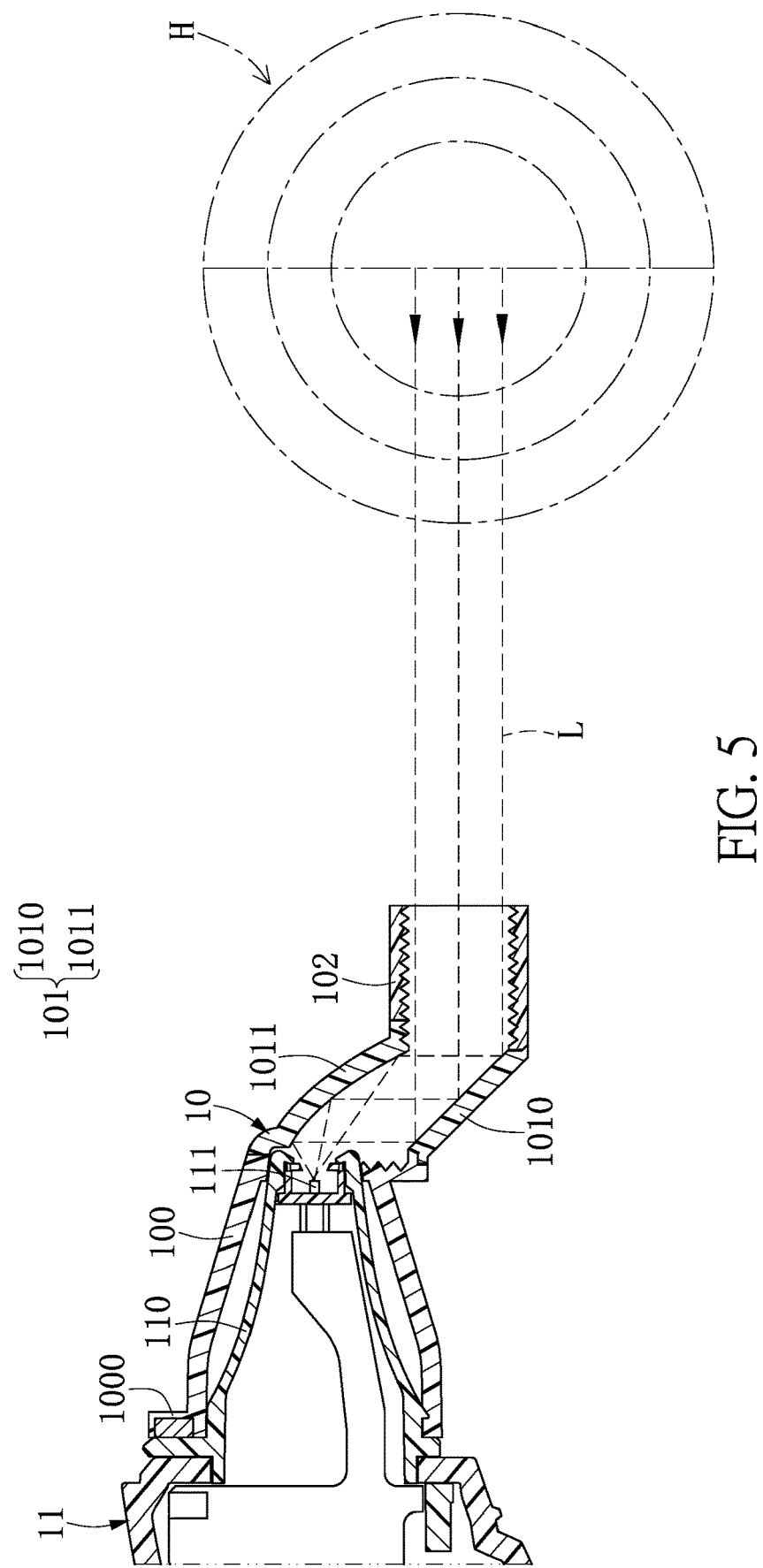
FIG. 5 is a third schematic view according to the first embodiment of the present disclosure, illustrating the reflection paths that the reflecting shell reflects heat radiation received from heat sources at different distances.
Figure 6:
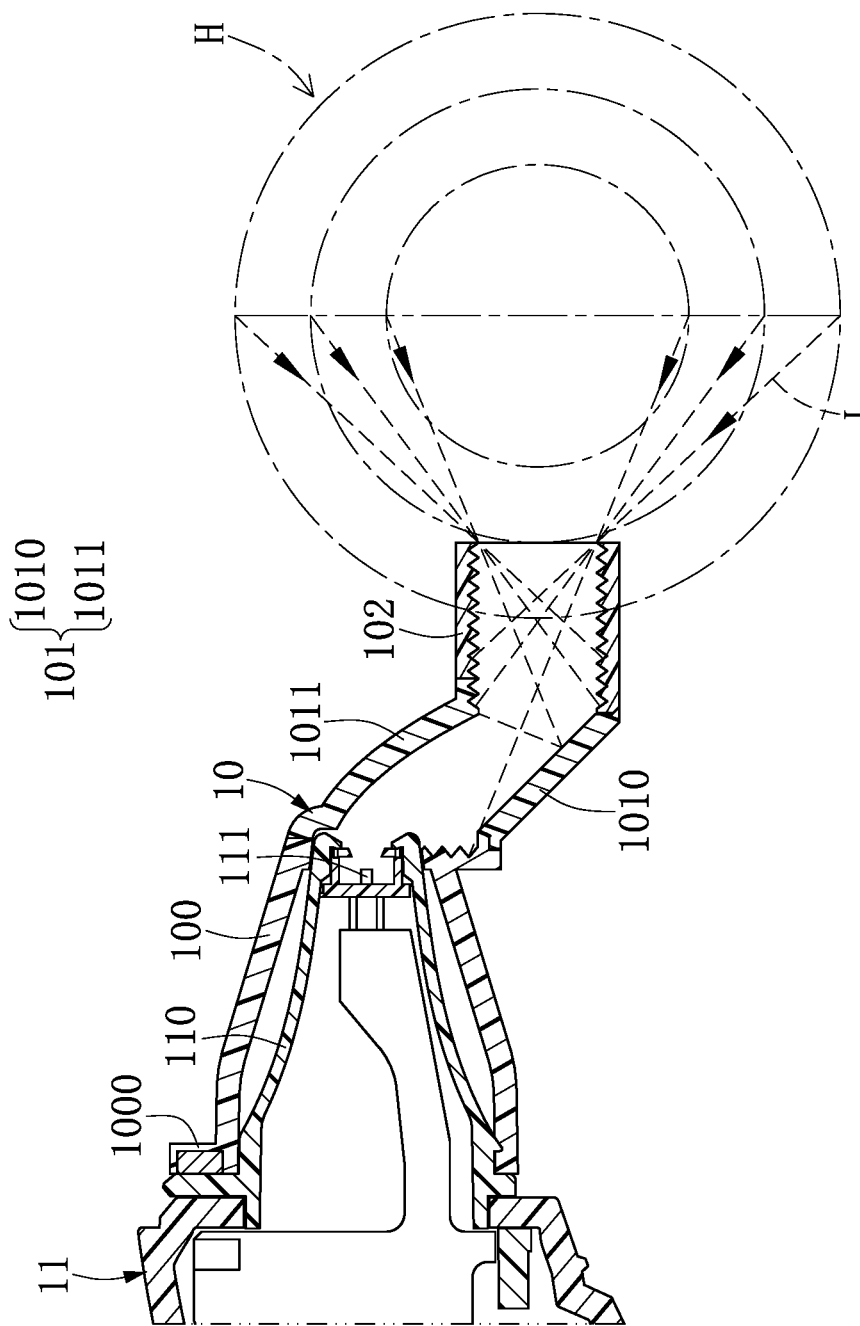
FIG. 6 is a first schematic view according to the first embodiment of the present disclosure, illustrating the reflecting shell receiving heat radiation from heat sources having a large angle at different distances and weakening them.
Figure 7:
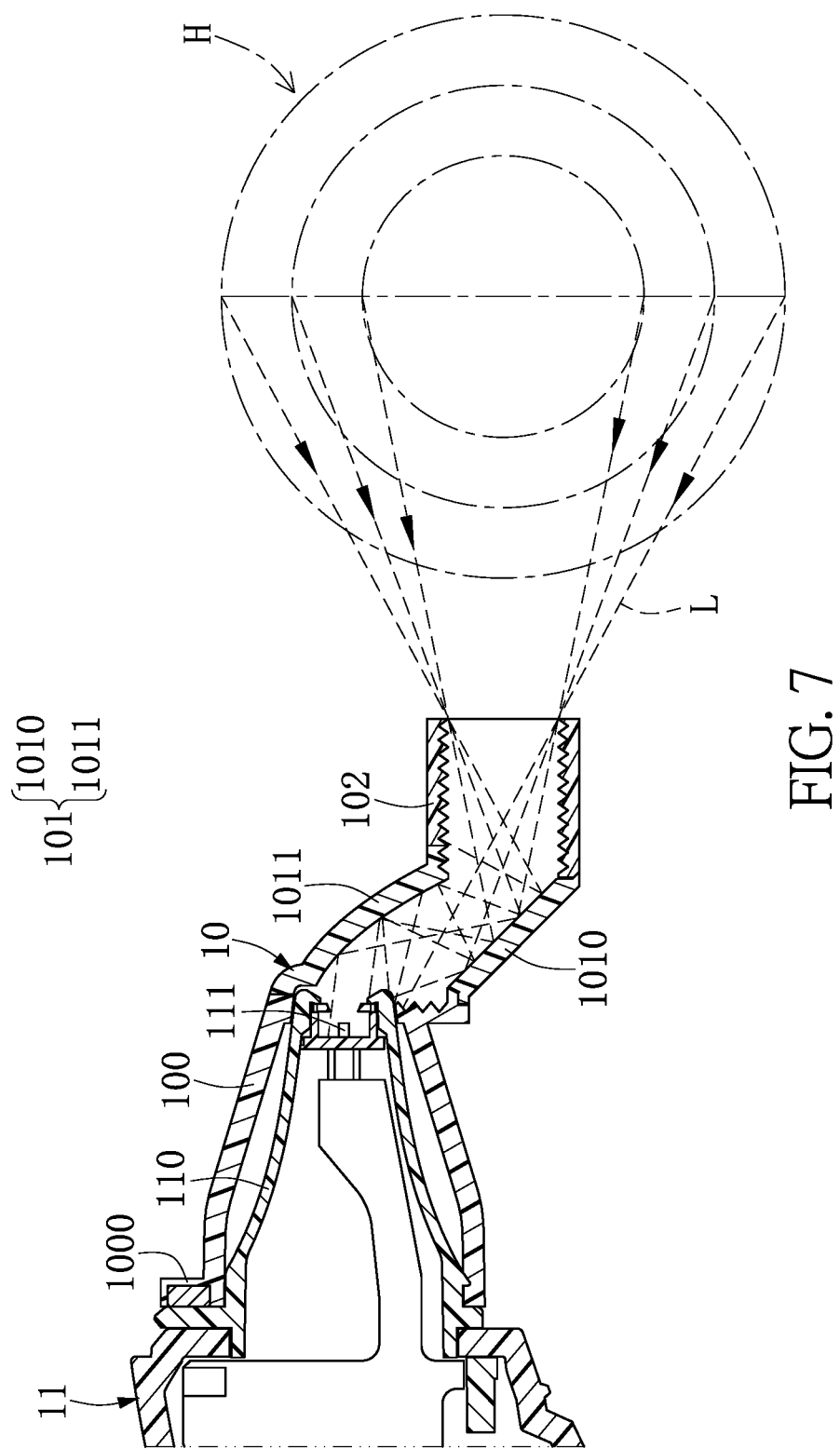
FIG. 7 is a second schematic view according to the first embodiment of the present disclosure, illustrating the reflecting shell receiving heat radiation from heat sources having a large angle at different distances and weakening them.
Figure 8:
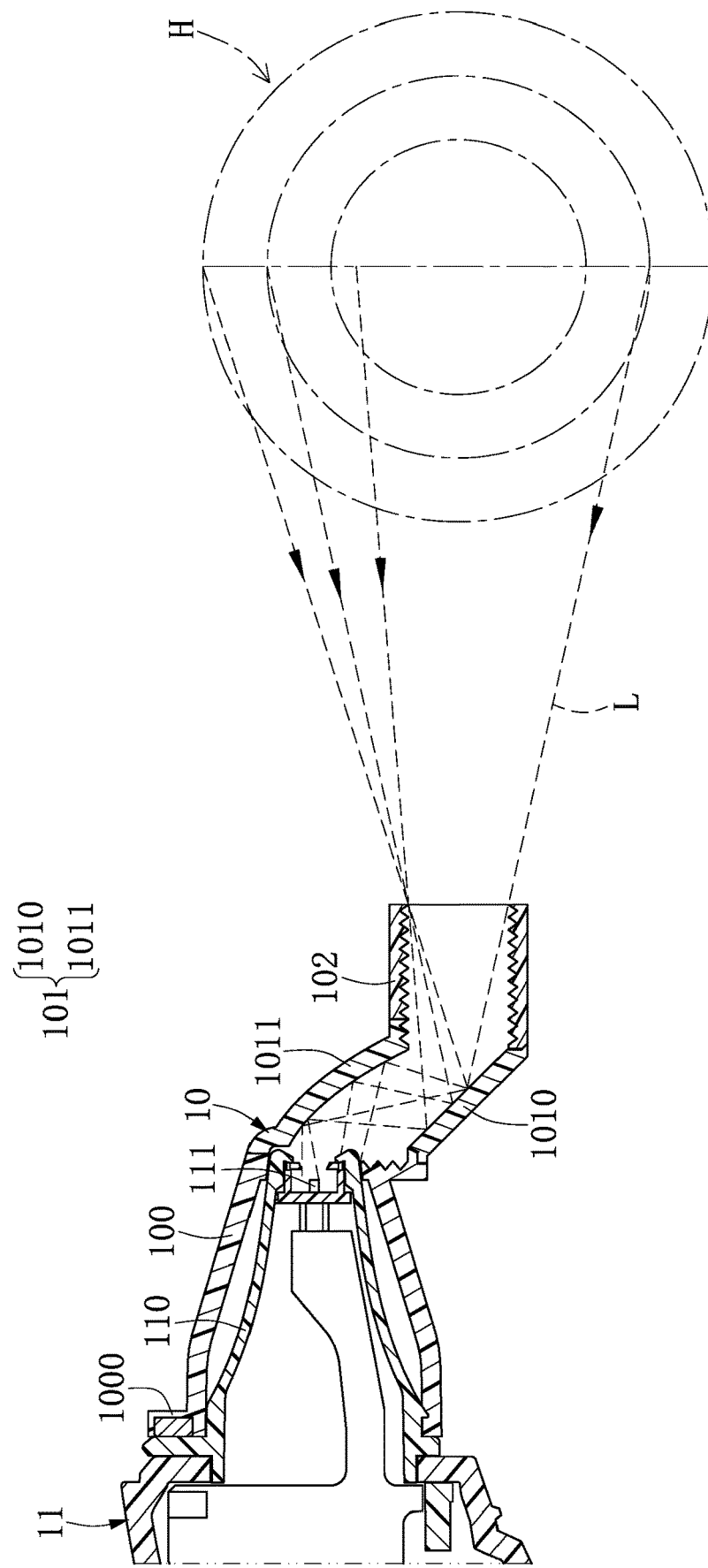
FIG. 8 is a third schematic view according to the first embodiment of the present disclosure, illustrating the reflecting shell receiving heat radiation from heat sources having a large angle at different distances and weakening them.

Referring to FIG. 1 to FIG. 8, FIG. 1 is a stereoscopic view of a reflecting shell according to a first embodiment of the present disclosure; FIG. 2 is a cross-sectional view of the reflecting shell according to the first embodiment of the present disclosure; FIG. 3 to FIG. 5 are first to third schematic views, respectively, according to the first embodiment of the present disclosure, illustrating the reflection paths that reflecting shell reflects heat radiation received from heat sources at different distance; FIG. 6 to FIG. 8 are first to third schematic views, respectively, according to the first embodiment of the present disclosure, illustrating the reflecting shell receives heat radiation from heat sources having a large angle at different distances. According to the foregoing figures, the first embodiment of the present disclosure provides a reflecting shell 10 including a hollow joint unit 100, a hollow guide unit 101, and a hollow receiving unit 102. One end of the hollow joint unit 100 has a stationary part 1000, and the stationary part 1000 is detachably connected with a detecting part 110 of a detecting device 11. One end of the hollow guide unit 101 is connected with the other end of the hollow joint unit 100, and an inner wall of the hollow guide unit 101 has a first reflective surface 1010 and a second reflective surface 1011 which correspond to each other. One end of the hollow receiving unit 102 is connected with the other end of the hollow guide unit 101. Heat radiation L from at least one heat source H enters the hollow guide unit 101 through the end of the hollow receiving unit 102 which is connected with the hollow guide unit 101, and the heat radiation L transmits to the detecting part 110 by the reflection of the first reflective surface 1010 and the second reflective surface 1011.

Specifically, the reflecting shell 10 of the present disclosure includes the hollow joint unit 100, the hollow guide unit 101 and the hollow receiving unit 102, and their material can be metal or plastic. The end of the hollow joint unit 100 which has the stationary part 1000 is for sleeving onto the detecting part 110 of the detecting device 11. In this embodiment, the detecting device 11 can be a conventional ear thermometer, but is not limited thereto. The hollow joint unit 100 and the hollow receiving unit 102 are connected with each other via the hollow guide unit 101. One part of the internal part of the hollow guide 101 is disposed with the first reflective surface 1010 and the second reflective surface 1011 which correspond to each other, and which can be high-infrared reflective surfaces made by sputtering, or mirrors. The other part of the internal part of the hollow guide unit 101 and the internal part of the hollow receiving unit 102 can undergo roughening and matting in order to eliminate unnecessary heat radiation L from large angle heat sources.

When a user operates the detecting device 11 to take the forehead temperature, the stationary part 1000 is sleeved on the detecting part 110 of the detecting device 11, and then the other end of the hollow receiving unit 102 is pointed to the subject's forehead to receive the heat radiation L, e.g., infrared radiation, emitted from the subject's forehead. After the heat radiation L enters the hollow receiving unit 102, the heat radiation L can be reflected by the first reflective surface 1010 and the second reflective surface 1011, and then is directed to the detecting part 110 to be received by the detecting device 11. The detecting device 11 obtains the parameters of the heat source H and converts the same into temperature-related values. Since ear temperature conversion methods and forehead temperature conversion methods are different, as is known in the art, detecting devices having software or programs for detecting forehead temperature are also known in the art, and will not be described in detail herein.

The technical effects of the structural design of the reflecting shell 10 are further described below.

Referring to FIG. 2, the first reflective surface 1010 of the reflecting shell 10 is at a predetermined angle S with respect to a central axis of the hollow receiving unit 102. The predetermined angle S is about 45 degrees (plus/minus 5 degrees), and preferably exactly 45 degrees. The second reflective surface 1011 can be a parabolic surface or an elliptical surface. Specifically, the detecting part 110 of the detecting device 11 has a receiving surface 111 for receiving infrared radiation, but is not limited thereto. The receiving surface 111 can be at the focus of a virtual ellipse V. The second reflective surface 1011 corresponding to the receiving surface 111 can be a part of the arc of the virtual ellipse V, that is, the second reflective surface 1011 can overlap a part of the arc of the virtual ellipse V.

In addition, reference is made to FIG. 3 to FIG. 8. It can be seen from FIG. 3 to FIG. 5 that after heat radiation L from a heat source H, projected from a small area of the forehead, enters the hollow receiving unit 102 of the reflecting shell 10, the heat radiation L can be projected to the detecting part 110 by the reflection of the first reflective surface 1010 and the second reflective surface 1011. Moreover, through the design described above, the reflecting shell 10 of the present disclosure can detect a small area of forehead and obtains temperature-related values from different detection distances, e.g. 1.5 centimeters (as shown in FIG. 3), 3 centimeters (as shown in FIG. 4) and 5 centimeters (as shown in FIG. 5). In other words, the reflecting shell 10 of the present disclosure has the effects of focusing and long-distance detection.

On the contrary, it can be seen from FIG. 6 to FIG. 8 that after heat radiation L from the heat source H having a large angle, projected from an area outside of the small area of the forehead, enters the hollow receiving unit 102 of the reflecting shell 10, the heat radiation L can be weakened and eliminated by multiple times of radiation scattering inside the hollow receiving unit 102. Even if the heat radiation L from the heat source H having a large angle can be reflected by the first reflective surface 1010 and the second reflective surface 1011, it still cannot reach the detecting part 110. FIGS. 6 to 8 illustrate conducting detection at distances of 1.5 centimeters, 3 centimeters, and 5 centimeters, respectively.

In addition, in one of the exemplary embodiments, the hollow joint unit 100, the hollow guide unit 101, and the hollow receiving unit 102 can be formed integrally as a one-piece structure.

It is worth mentioning that the reflecting shell 10 of the present disclosure is not limited to the above-mentioned examples, and can be modified or changed adaptively by the manufacturers or users according to practical implementation.

Second Embodiment

Figure 9:
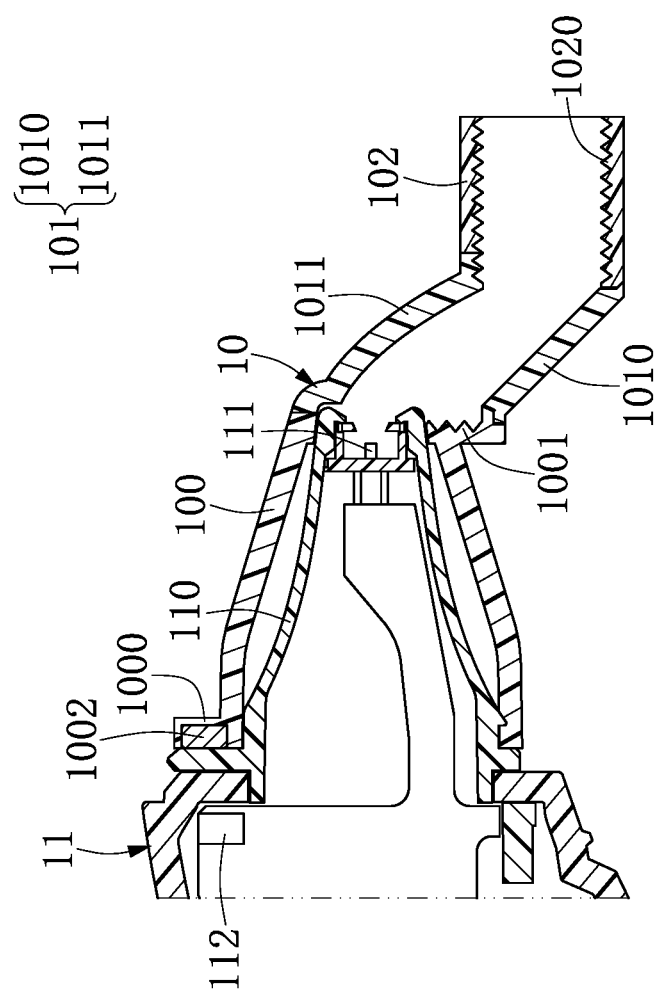
FIG. 9 is a cross-sectional view of the reflecting shell according to a second embodiment of the present disclosure.

Reference is made to FIG. 9, which is a cross-sectional view of the reflecting shell according to a second embodiment of the present disclosure, and with further reference made to FIGS. 1 to 8. By the figures mentioned above, the second embodiment of the present disclosure provides another configuration of the reflecting shell 10 which is similar to that in the first embodiment, but the difference being that the inner wall of the hollow receiving unit 102 of the reflecting shell 10 of the second embodiment has a matting part 1020.

For example, the inner wall of the hollow receiving unit 102 may be formed with a matting part 1020, and the matting part 1020 can be a rough jagged structure or a coating with low emissivity by spraying, but is not limited thereto. The hollow joint unit 100 can further have a radiation removing part 1001 at the position being connected with the hollow receiving unit 102. The radiation removing part 1001 can be a rough jagged structure, but is not limited thereto. Therefore, when the user operates the detecting device 11 with the reflecting shell 10 to take a forehead temperature, the heat radiation L from the heat source H, projected from an area outside of the small area of the subject's forehead, enters the hollow receiving unit 102 of the reflecting shell 10. At this time, one part of the heat radiation L would be eliminated or blocked by the matting part 1020, and the other part of the heat radiation L would not be able to reach the detecting part 110 or would be eliminated or blocked by the radiation removing part 1001, even if this other part of the heat radiation L is reflected by the first reflective surface 1010 and the second reflective surface 1011.

In addition, in one of the preferred implementations, the detecting device 11 has a magnetic switch near the body of the detecting part 110, and the stationary part 1000 of the hollow joint unit 100 of the reflecting shell 10 can correspondingly have a magnetic element 1002. Generally, when the user operates the detecting device 11, the detecting device 11 is in an ear temperature detecting mode. When the user is to take a forehead temperature, the reflecting shell 10 can be sleeved on the detecting part 110 of the detecting device 11. At this time, the magnetic element 1002 triggers the magnetic switch 112 of the detecting device 11 to make the magnetic switch 112 produce a signal that is sent to a controller (not shown) or a processor (not shown) in the detecting device 11, and the controller or the processor switches to a forehead temperature detecting mode from the ear temperature detecting mode. On the other hand, when the reflecting shell 10 is detached from the detecting device 11 by the user, the magnetic switch 112 also produces another signal that is sent to the controller or the processer, and the controller or the processor switches to the ear temperature detecting mode from the forehead temperature detecting mode.

In another preferred implementation, the detecting device 11 can be disposed with control buttons (e.g., physical buttons or virtual touch buttons, not shown in the figures), and one of the buttons can correspond to the ear temperature detecting mode, and another button can correspond to the forehead temperature detecting mode. Users can switch the modes by touching each button.

Third Embodiment

Figure 10:
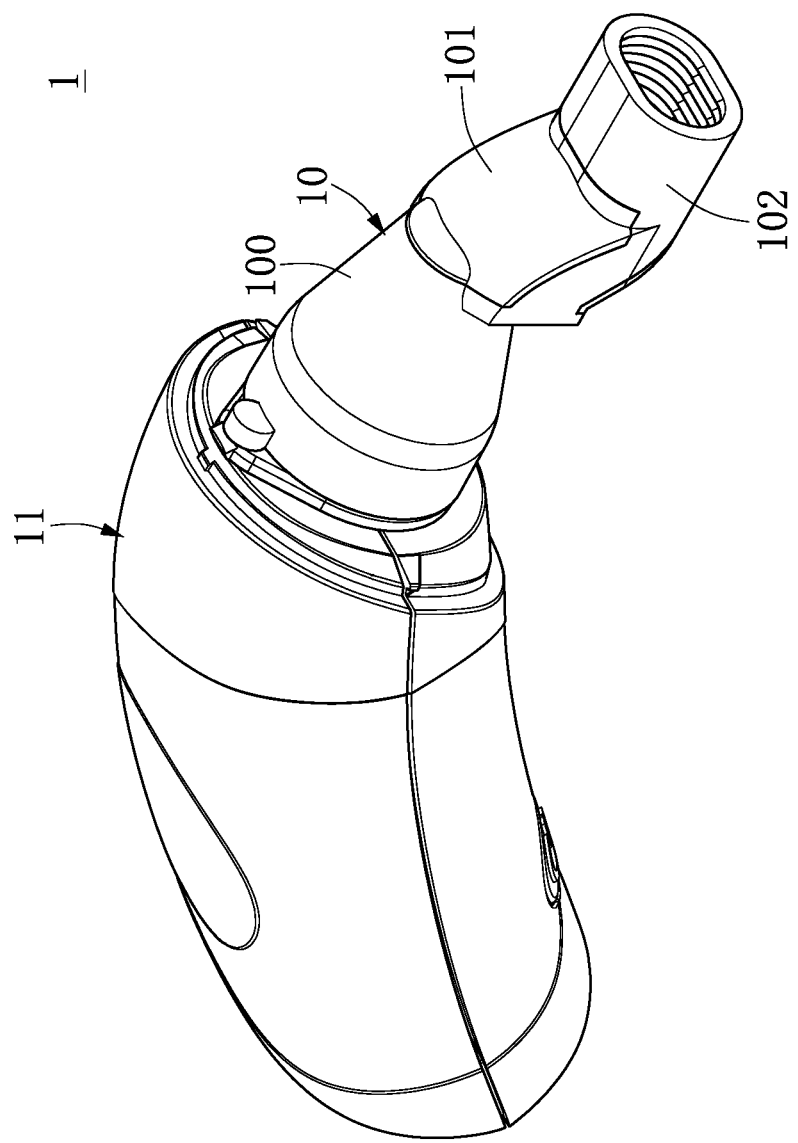
FIG. 10 is a stereoscopic view of a temperature detecting device according to a third embodiment of the present disclosure.
Figure 11:
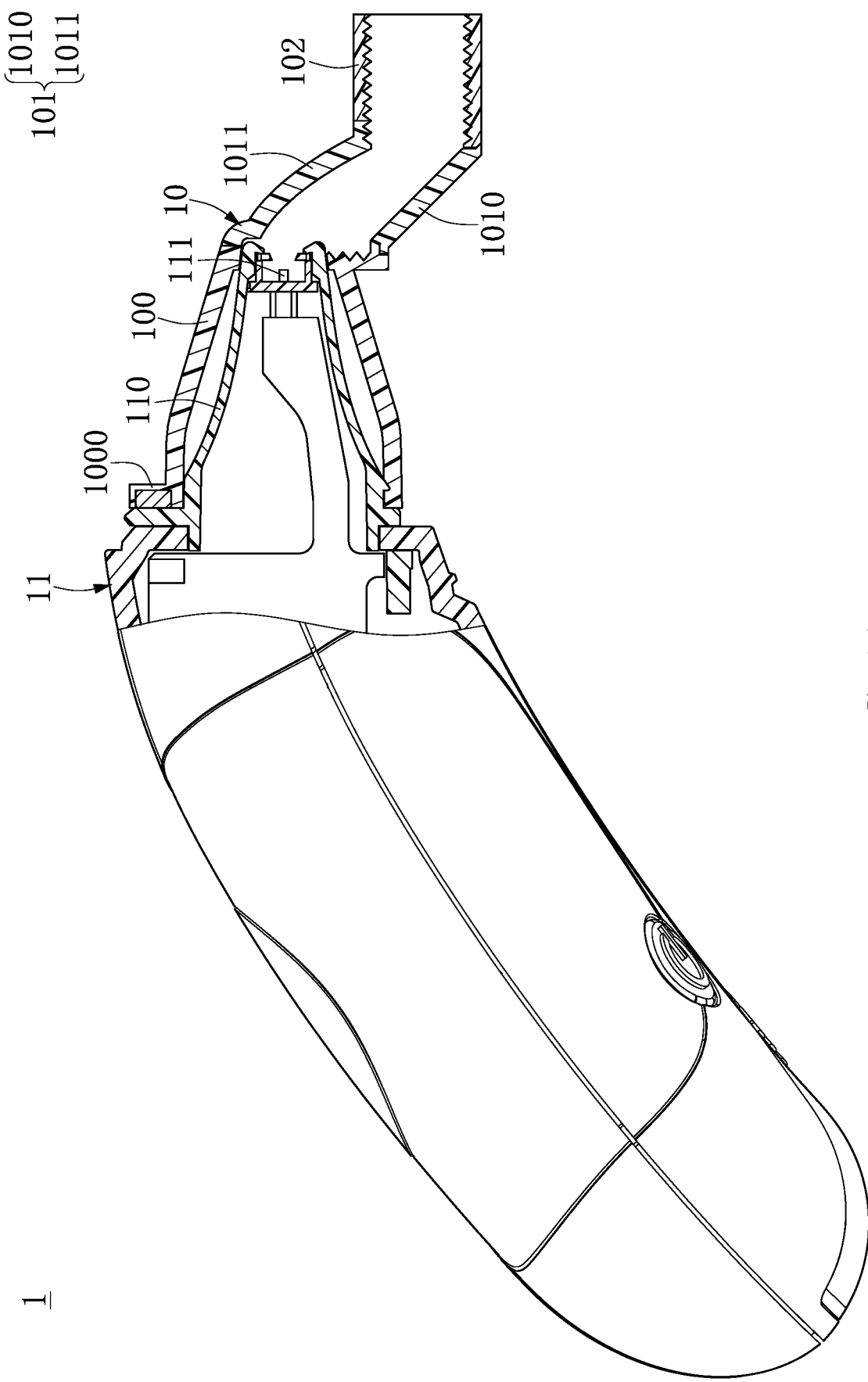
FIG. 11 is a cross-sectional perspective view of the temperature detecting device according to the third embodiment of the present disclosure.

Reference is next made to FIG. 10 and FIG. 11, with further reference FIGS. 1 to 9. FIG. 10 is a stereoscopic view of a temperature detecting device according to a third embodiment of the present disclosure, and FIG. 11 is a cross-sectional perspective view of the temperature detecting device according to the third embodiment of the present disclosure. The operation of the measuring device 1 of the third embodiment is similar with that of the reflecting shell 10 in the above embodiments, and is not described in detail therein. By the figures mentioned above, the third embodiment of the present disclosure provides a temperature detecting device 1 including the detecting device 11 and the reflecting shell 10. The detecting device 11 includes a detecting part 110 for receiving infrared light. The reflecting shell 10 includes the hollow joint unit 100, the hollow guide unit 101 and the hollow receiving unit 102. One end of the hollow joint unit 100 has the stationary part 1000, and the stationary part 1000 is detachably connected with a detecting part 110 of the detecting device 11. One end of the hollow guide unit 101 is connected with the other end of the hollow joint unit 100, and the inner wall of the hollow guide unit 101 has the first reflective surface 1010 and the second reflective surface 1011 which correspond to each other. One end of the hollow receiving unit 102 is connected with the other end of the hollow guide unit 101. Heat radiation L from at least one heat source H enters the hollow guide unit 101 through the end of the hollow receiving unit 102 which is connected with the hollow guide unit 101, and the heat radiation L is transmitted to the detecting part 110 by the reflection of the first reflective surface 1010 and the second reflective surface 1011.

Specifically, the temperature detecting device 1 of the present disclosure includes the detecting device 11 and the reflecting shell 10. The detecting device 11 can be the ear thermometer having programs or software for detecting forehead temperature, but is not limited thereto. The detecting device 11 has the detecting part 110 for receiving the heat radiation L. The reflecting shell 10 includes the hollow joint unit 100, the hollow guide unit 101, and the hollow receiving unit 102, the material of which can be metal or plastic. One end of the hollow joint unit 100 has the stationary part 1000, and the stationary part 1000 can be sleeved on the detecting part 110 of the detecting device 11. The hollow joint unit 100 and the hollow receiving unit 102 are connected with each other through the hollow guide unit 101. One part of the internal part of the hollow guide unit 101 is disposed with the first reflective surface 1010 and second reflective surface 1011 which correspond to each other. The first reflective surface 1010 and the second reflective surface 1011 can be high-infrared reflective surfaces made by sputtering, or mirrors. The other internal part of the hollow guide 101 and the internal part of the hollow receiving unit 102 can be roughening and matting.

When a user operates the detecting device 11 to take the forehead temperature, the temperature detecting device 1 receives the heat radiation L from the at least one heat source, e.g. infrared radiation, projected from the subject's forehead through the hollow receiving unit 102. After the heat radiation L enters the hollow receiving unit 102, the heat radiation L can be reflected by the first reflective surface 1010 and the second reflective surface 1011, and then be directed to the detecting part 110 to be received by the detecting device 11. The detecting device 11 obtains the parameters of the heat source H and converts the same to temperature-related values. As shown in FIG. 2, the first reflective surface 1010 of the temperature detecting device 1 of the present disclosure is at a predetermined angle S with respect to a central axis of the hollow receiving unit 102. The predetermined angle S is about 45 degrees (plus/minus 5 degrees), and preferably exactly 45 degrees. The second reflective surface 1011 can be a parabolic surface or an elliptical surface; specifically, the detecting part 110 of the detecting device 11 can have the receiving surface 111, and the receiving surface 111 can be at the focus of a virtual ellipse V. The second reflective surface 1011 corresponding to the receiving surface 111 can be a part of the arc of the virtual ellipse V, that is, the second reflective surface 1011 can overlap one part of the arc of the virtual ellipse V.

In addition, in one of the exemplary embodiments, the hollow joint unit 100, the hollow guide unit 101, and the hollow receiving unit 102 of the temperature detecting device 1 of the present disclosure can be combined into a one-piece component. In other words, the hollow joint unit 100, the hollow guide unit 101, and the hollow receiving unit 102 can be formed integrally as a one-piece structure.

In another preferred implementation, the inner wall of the hollow receiving unit 102 of the present disclosure may be formed with the matting part 1020, and the matting part 1020 can be a rough jagged structure, but is not limited thereto. The hollow joint unit 100 can further have the radiation removing part 1001 at the position being connected with the hollow receiving unit 102. The radiation removing part 1001 can be a rough jagged structure, as shown in FIG. 9, but is not limited thereto. Therefore, when the user operates the detecting device 11 with the reflecting shell 10 to take a forehead temperature, heat radiation L from the heat source H having a large angle, projected from an area outside of the small area of the subject's forehead, enters the hollow receiving unit 102 of the reflecting shell 10. At this time, one part of the heat radiation L would be eliminated or blocked by the matting part 1020, and the other part of the heat radiation L would not be able to reach the detecting part 110, or would be eliminated or blocked by the radiation removing part 1001, even if this other part of the heat radiation L is reflected by the first reflective surface 1010 and the second reflective surface 1011.

In addition, in one of the preferred implementations, the detecting device 11 of the temperature detecting device 1 of the present disclosure has a magnetic switch near the body of the detecting part 110, and the stationary part 1000 of the hollow joint unit 100 of the reflecting shell 10 can correspondingly have a magnetic element 1002. Generally, when the user operates the detecting device 11, the detecting device 11 is in the ear temperature detecting mode. When the user is to take forehead temperature, the reflecting shell 10 is sleeved on the detecting part 110 of the detecting device 11. At this time, the magnetic element 1002 triggers the magnetic switch 112 of the detecting device 11 to make the magnetic switch 112 produce a signal that is sent to a controller (not shown) or a processor (not shown) in the detecting device 11, and the controller or the processor switches to the forehead temperature detecting mode from the ear temperature detecting mode. On the contrary, when the reflecting shell 10 is detached from the detecting device 11 by the user, the magnetic switch 112 also produces another signal that is sent to the controller or the processor, and the controller or the processor switches to the ear temperature detecting mode from the forehead temperature detecting mode.

In another preferred implementation, the detecting device 11 of the temperature detecting device 1 can be disposed with control buttons (e.g., physical buttons or virtual touch buttons, not shown in the figures), and one of the buttons can correspond to the ear temperature detecting mode, and another button can correspond to the forehead temperature detecting mode. Users can switch the modes by touching each button.

One of the beneficial advantages of the present disclosure is that the detecting device 11 has the function of taking forehead temperature through the technical features of "one end of the hollow joint unit 100 has a stationary part 1000, and the stationary part 1000 is detachably connected with the detecting part 110 of the detecting device 11", "one end of the hollow guide unit 101 is connected with the other end of the hollow joint unit 100, and an inner wall of the hollow guide unit 101 has a first reflective surface 1010 and a second reflective surface 1011 which correspond to each other", "one end of the hollow receiving unit 102 is connected with the other end of the hollow guide unit 101", and "heat radiation L from at least one heat source H enters the hollow guide unit 101 through the end of the hollow receiving unit 102 which is connected with the hollow guide unit 101, and the heat radiation L is transmitted to the detecting part 110 by the reflection of the first reflective surface 1010 and the second reflective surface 1011", and compared with the conventional non-contact thermometer, the detecting device has the focusing function and long-distance detection. In addition, the temperature detecting device of the present disclosure has both the functions of detecting ear temperature and forehead temperature.

Further, the reflecting shell 10 and the temperature detecting device 1 in the present disclosure can transmit the heat radiation L from the heat source H projected from a small area of forehead to the detecting part 110 by the reflection of the first reflective surface 1010 and the second reflective surface 1011, which is based on the features of "one end of the hollow joint unit 100 has a stationary part 1000, and the stationary part 1000 is detachably connected with the detecting part 110 of the detecting device 11", "one end of the hollow guide unit 101 is connected with the other end of the hollow joint unit 100, and an inner wall of the hollow guide unit 101 has a first reflective surface 1010 and a second reflective surface 1011 which correspond to each other", "one end of the hollow receiving unit 102 is connected with the other end of the hollow guide unit 101", and "heat radiation L from at least one heat source H enters the hollow guide unit 101 through the end of the hollow receiving unit 102 which is connected with the hollow guide unit 101, and the heat radiation L is transmitted to the detecting part 110 by the reflection of the first reflective surface 1010 and the second reflective surface 1011". After heat radiation L from the heat source H having a large angle, projected from an area outside of the small area of the forehead, enters the hollow receiving unit 102 of the reflecting shell 10, the heat radiation L can be weakened and eliminated by multiple times of radiation scattering inside the hollow receiving unit 102. Even if the heat radiation L from the heat source H having a large angle can be reflected by the first reflective surface 1010 and the second reflective surface 1011, it still cannot reach the detecting part 110. Furthermore, the reflecting shell 10 of the present disclosure can detect a small area of forehead and obtain temperature-related values from different detection distances, such as 1.5 centimeters (as shown in FIG. 3), 3 centimeters (as shown in FIG. 4) and 5 centimeters (as shown in FIG. 5). In other words, the reflecting shell 10 of the present disclosure has the effects of focusing and long-distance detection, and has functions of detecting both ear temperature and forehead temperature.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A reflecting shell, comprising:
    a hollow joint unit, one end of the hollow joint unit having a stationary part, the stationary part being detachably connected with a detecting part of a measuring device;
    a hollow guide unit, one end of the hollow guide unit being connected with the other end of the hollow joint unit, an inner wall of the hollow guide unit having a first reflective surface and a second reflective surface which correspond to each other; and
    a hollow receiving unit, one end of the hollow receiving unit being connected with the other end of the hollow guide unit;
    wherein heat radiation from at least one heat source enters the hollow guide unit through the end of the hollow receiving unit which is connected with the hollow guide unit, and the heat radiation is transmitted to the detecting part by the reflection of the first reflective surface and the second reflective surface;
    wherein the second reflective surface is a parabolic surface.

2. The reflecting shell according to claim 1, wherein the hollow joint unit, the hollow guide unit, and the hollow receiving unit are formed integrally as a one-piece structure.

3. The reflecting shell according to claim 1, wherein the first reflective surface is at a predetermined angle with respect to a central axis of the hollow receiving unit, and the predetermined angle is 45 degrees.

4. The reflecting shell according to claim 1, wherein the inner wall of the hollow receiving unit has a matting part.

5. A temperature detecting device, comprising:
    a measuring device having a detecting part, and
    a reflecting shell including:
    a hollow joint unit, one end of the hollow joint unit having a stationary part, the stationary part being detachably connected with a detecting part of a measuring device;
    a hollow guide unit, one end of the hollow guide unit being connected with the other end of the hollow joint unit, an inner wall of the hollow guide unit having a first reflective surface and a second reflective surface which correspond to each other; and
    a hollow receiving unit, one end of the hollow receiving unit being connected with the other end of the hollow guide unit;
    wherein heat radiation from at least one heat source enters the hollow guide unit through the end of the hollow receiving unit which is connected with the hollow guide unit, and the heat radiation is transmitted to the detecting part by the reflection of the first reflective surface and the second reflective surface;

wherein the second reflective surface is a parabolic surface.

6. The temperature detecting device according to claim 5, wherein the hollow joint unit, the hollow guide unit, and the hollow receiving unit are formed integrally as a one-piece structure.

7. The temperature detecting device according to claim 5, wherein the first reflective surface is at a predetermined angle with respect to a central axis of the hollow receiving unit, and the predetermined angle is 45 degrees.

8. The temperature detecting device according to claim 5, wherein the inner wall of the hollow receiving unit has a matting part.

* * * * *